US005376457A

United States Patent [19]

Smith

[11] Patent Number: 5,376,457

[45] Date of Patent: Dec. 27, 1994

[54] VEHICLE COATING PROCESS

[75] Inventor: William C. Smith, Wooster, Ohio

[73] Assignee: Volvo GM Heavy Truck Corporation, Greensboro, N.C.

[21] Appl. No.: 109,092

[22] Filed: Aug. 19, 1993

[51] Int. Cl.[5] .............................................. B32B 15/04

[52] U.S. Cl. ................................. 428/457; 204/180.5; 204/180.6; 204/181.1; 205/115; 427/407.1; 427/409

[58] Field of Search ............... 204/180.5, 180.6, 180.7, 204/181.1; 205/83, 115, 170; 427/409, 407.1, 410, 412.1; 428/457

[56] References Cited

U.S. PATENT DOCUMENTS

| | | | |
|---|---|---|---|
| 3,647,509 | 3/1922 | Keiser et al. | 106/48 X |
| 3,998,716 | 12/1976 | Masar et al. | 204/181 |
| 4,139,672 | 2/1979 | Ozawa et al. | 428/323 |
| 4,218,493 | 8/1980 | Rarey | 427/27 X |
| 4,265,936 | 5/1981 | Prohaska | 427/140 |
| 4,529,632 | 7/1985 | Fujii et al. | 427/409 |
| 4,943,447 | 7/1990 | Nelson et al. | 427/379 X |
| 4,974,307 | 12/1990 | Uebayashi et al. | 29/460 |
| 4,985,283 | 1/1991 | Ogata et al. | 427/424 |

*Primary Examiner*—Michael Lusignan

*Attorney, Agent, or Firm*—Watts, Hoffmann, Fisher & Heinke Co.

[57] ABSTRACT

A process of applying a finish to an electrically conductive vehicle body by passing the body through a water-based electrocoating bath while applying a voltage between the body and the bath to electro-coat the body with constituents of the bath. The coat is dehydrated to a state of sufficient dryness to permit spray application of a water-base primer while maintaining the coat cool enough to avoid fusing the coat. A coating of water-base primer is then sprayed over the dehydrated but otherwise untreated E coat. The coat and coating are then baked to concurrently fuse both of them. The primer sprayed on an interior portion of the body is pigmented to a desired finished color. Selected portions of the baked coating on the exterior of the body are light sanded to remove entrained dirt and thereafter finish coating is applied to the body.

21 Claims, No Drawings

VEHICLE COATING PROCESS

FIELD OF THE INVENTION

This invention relates to a method of applying protective coatings to metal substrates, and more particularly, to a process which is especially suited for applying protective coatings to vehicle bodies.

1. Background of the Invention

Present day, over the highway, trucks and tractors such as the large Class A highway tractors, typically have forwardly, tilting unitized hood and fender assemblies that are made from composites. While the hood and fender assemblies are composites, the truck bodies usually continue to be sheet metal fabrications of aluminum and/or galvanized steel.

An over-the-highway tractor is typically operated for at least 500,000 miles during its life. Often, such trucks and tractors are operated for extended periods without washing. They are frequently subjected to attack by corrosive solutions such as water and slush bearing road salt during snowy conditions and ocean spray. If a vehicle manufacturer is to remain competitive, it is essential that a vehicle body be protected with coatings that provide outstanding corrosion resistance.

It has now become conventional to immerse a vehicle body in a tank of a base coating finish and deposit a protective base coating through an electrocoating process, Once coated, the body is baked to provide a fused, base coating typically referred to as an E coat. The E coat is sanded and a primer surfacer is then spray-applied over the E coat. The body is again baked to fuse the primer surfacer. After the primer surfacer has been baked, the body is again sanded to prepare the body for a finish coating.

While reasonably good corrosion resistance has been provided with the described process, it is costly both because of the high power requirements for the two baking operations prior to finish coating, and labor intensive because of the required two sandings of the entire body.

SUMMARY OF THE INVENTION

With the present invention, the vehicle body is electrocoated with a water-based material. Either anodic or cathodic electrocoating may be employed. Once the body has been electrocoated and removed from the electrocoating tank, the applied coating is dehydrated, but maintained at a temperature cool enough to avoid fusing of the resins in the coating. Once dried, and without sanding or other further processing, a water-base primer surfacer coating is applied over the E coat. The vehicle body is then baked to fuse the constituents of both coatings and provide a smooth protective layer over the entire vehicle which requires no sanding other than light touch-up to remove any dirt particles that may have been entrained. Thereafter, the finished coating is applied to the body.

One of the outstanding advantages of the invention is that the primer surfacer used for painting the interior surfaces with a cab may be pigmented with the color the finished vehicle is to have. While a finish exterior coating is subsequently applied to exterior surfaces over the two commonly baked coatings, no further painting of the interior is required because the wet-on-wet process and baking produces a smooth attractive finish free of orange peel and other defects.

It is believed that because both E coat and primer surfacer are applied before baking, the flow-out during baking and fusing is greatly enhanced because, together the two coatings are far thicker than a single coat and the two coatings flow and fuse together.

DESCRIPTION OF THE PREFERRED EMBODIMENTS

A vehicle body to be coated is suspended from an overhead chain conveyor. The suspending mechanism includes contacts suitable for applying electrical potential to the body during an electrocoating process. The body is cleaned and prepared with well known procedures and then passed into an electrocoating tank. The tank contains a sufficient volume of electrocoat material to allow for full immersion of the vehicle cab. The preferred electrocoat material is a product sold under the designation FMA-0006 by the Valspar Corporation of Pittsburgh, Pa. This material is high in solids and free of lead and chromium. It is a waterbase material.

Once the body is immersed in the bath, a potential is applied to the electrocoating material and to the body preferably through an anodic electro-coating process. The potential causes resins from the electrocoat material to be deposited onto all internal and external surfaces of the body including its interstices.

Upon removal of a body from the electrocoat bath, the cab is passed through a series of undulations to facilitate drainage of water from the coating. The body is then dehydrated by passing it through an oven. The oven is maintained at a set temperature of from about 150° F. preferably to 200° F., but as high as 250° F. to yield a substrate (vehicle body) temperature of from about 115° F. to 125° F. at oven exit. Thus, the substrate is heated enough to dry the E coat, but maintained cool enough to avoid fusing.

After dehydration, the substrate is forced cool by passing it through an enclosure with high velocity fans. The temperature of the cab should be reduced to a temperature approximately equal to ambient temperature.

After cooling, the body is delivered to a finishing booth. The body is then spray-coated with a primer surfacer in the form of a water-reducible enamel. The preferred enamel material is also sold by the Valspar Corporation. The product designation of the preferred product is WPA-0021. It is a three-resin material containing polyester, epoxy and melamine resins. For external application, the enamel is typically gray, but for interior, it is preferably pigmented to the intended finish color of the vehicle being manufactured.

This preferred water-reducible enamel has a viscosity of 41+ or −3 inches with a four-pound Zohn cup at 80° F. It weights 9.36 + or −0.15 pounds per gallon. Solid content is 38.2+ or −1.5% by weight, and 26.8+ or −1.5 by volume. Theoretical coverage of a gallon is 715 square feet at 1.0 rail dry film thickness.

The sprayed body substrate is next conveyed to an oven maintained at a temperature from 360°-375° F. The substrate. is baked for about 30 minutes to cure both the E coat and the sprayed-on primer surfacer coat, and fuse the resins of both into a unitary smooth finish. Specifically, the cure or fusing is accomplished by heating the substrate to about 310 ° F. for about 10 minutes or longer. The finish produced by the process is extremely smooth and free of orange peel. Substrates with the wet-on-wet primer followed by a gloss finish coating have also shown superb characteristics.

The finished primer coating has a dry film thickness of from 0.6–0.8 millimeters and a gloss of 40–50 at a 60° meter. It will withstand a 4H+ pencil hardness test which is a test in which pencils are dragged at 45° across a surface to determine the hardest pencil which will not mar the surface. The finish withstands over 100 double rubs in a so-called double rub test. A double rub test is performed by saturating cloth with a clean-up solvent, in this case an 80/20 blend of water and cellosolve. The finish will also withstand direct and reverse impact tests of 100 foot pounds.

Salt spray resistance in tests of 100 hours showed no scribe or blister failures on cold-rolled steel, galvanized steel and aluminum substrates, and all were also free of field blisters. After 400 hours, the steel substrates showed less than ⅛ inch scribe tests and no field blisters, while the aluminum substrates were still free of blisters and not subject to failure on the scribe test. Further testing showed humidity resistance up to 800 hours is excellent with no blistering.

With the scribe test, cross-hatching with a sharp implement over a small area creates a series of squares. With a pressure-sensitive adhesive, one then determines whether the finish in some of these delineated small squares will be pulled off by pressure-sensitive adhesion.

EXAMPLE I

Valspar FMA-0006 was applied as an E coat to vehicle bodies. The film thickness ranged from 0.66 mils to 1.0 mils with an average milage of 0.91. Upon removal of a vehicle body from an electrocoat bath, each body went through a series of undulations to facilitate drainage of water from the coating. Each body was then dehydrated by passing it through an oven specially manufactured for the purpose by Thermo Engineering of South Carolina. The oven is approximately 55 feet long with six turbulator fans mounted on its walls. There are two direct fire burners located near the oven ceiling. The oven was maintained at a set temperature of about 150° F., yielding a 122° F. substrate (vehicle body) temperature at oven exit.

After dehydration, the substrate was forced cool by passing it through an enclosure with high velocity fans. The force cooling chamber is approximately 16 feet long. The temperature of the cab was reduced to approximately 70° F. under conditions where the ambient was 60° F. and the temperature of the body at application was 65° F.

After cooling, the body was delivered to a finishing booth. The body was then spray-coated with the Valspar Corporation WPA-0021, a water-reducible enamel, as a primer surfacer. For external application, the enamel was gray, but for interior, it was pigmented to the intended finish color of the vehicle being manufactured.

The primer surfacer was spray-applied, using a JGHV-530 DeVilhiss Atomizer with a 46 mp air cap and an AV-2120-FF (0.055) fluid orifice. Actual fluid delivery was preferably about 390 milliliters per minute at 26 psi fluid pressure setting, with atomizing air optimized at 75 psi. The fluid handling system for the primer surface was provided with 2:1 pumps, day tank, electric agitation, surge chamber/filters with a 100 mesh element, and a Graco paint totalizer. The primer surface was reduced to 15:1 with water, and yielded a 64 G.E. 2 on 67° F. Thicknesses of the primer surfacer ranged from 0.3 to 0.8 mils with an average milage of 0.5.

The sprayed body was next conveyed to an oven maintained at a temperature of 360° F. or higher. The body was baked for about 30 minutes to cure both the E coat and sprayed-on primer surfacer coat, and fuse the resins of both into a smooth finish. The flash-off time was about 15 minutes and the cure time was about 16 minutes.

The finished primer coatings had dry film thicknesses ranging from 1.9 to 3.4 millimeters with an average thickness of 2.75 and a gloss of about 45 at a 60° meter. It withstood a 4H+ pencil hardness test. The finish also withstood over 100 double rubs. The finish also withstood direct and reverse impact tests of 100 foot pounds. After very light sanding as required on some cabs to remove dust, finish coatings of Sherwin Williams two-component urethane were applied.

EXAMPLE II

Comparison tests were conducted on sheets of aluminum, cold rolled steel and galvanized steel. As a control and comparison, Bonderite 1000 Cold Rolled Steel was also utilized. Following standard zinc phosphate and chromic acid treatments, each of the substrates was coated with an electrocoat of Valspar FNA-0006 material and then air dried to dehydrate the electrocoat without curing or fusing the coat. The substrates were then spray coated with gray, water-reducible Valspar WPA-0021 reduced by ten parts by volume of material to one part by volume of de-ionized water, then spray-applied to each of the substrates. The substrates were then placed in an oven at 360°–375° F., producing a flash-out time of 15 minutes and cure times of 15–17 minutes. Dry film thickness after baking ranged between 0.6 and 0.8 rail.

Samples of each of the four substrate materials so coated were then submitted to salt-spray resistance tests with the following results after 100 hour segments:

| Time | Bonderite 1000 CRS | VGHT CRS | VGHT GALV. STEEL | VGHT ALUMINUM |
|---|---|---|---|---|
| 100 hrs. | no scribe<br>no field blisters | no scribe<br>no field blisters | no scribe<br>no field blisters | no scribe<br>no field blisters |
| 200 hrs. | less than 1/16" scribe<br>no field blisters | less than 1/16" scribe<br>no field blisters | less than 1/16" scribe<br>no field blisters | * *<br>no field blisters |
| 300 hrs. | less than 1/16" scribe<br>no field blisters | less than ⅛" scribe<br>no field blisters | less than ⅛" scribe<br>no field blisters | * *<br>no field blisters |
| 400 hrs. | less than ⅛" scribe<br>no field blisters | less than ⅛" scribe<br>no field blisters | less than ⅛" scribe<br>no field blisters | * *<br>no field blisters |

Samples of each of the four substrates with fused wet on wet coatings on them were submitted to humidity tests. They were inspected after 200-hour intervals up to a total of 1,000 hours, and each substrate was excellent with no blistering throughout the test.

EXAMPLE III

A series of tests were conducted on truck cabs coated in a preliminary test production run. The cabs were coated with the same base E coat to thicknesses ranging from 0.66 mils to 1.1 mils with an average of 0.91. The finish application was the same as described in Example I with the exception that the dehydrating oven did not as yet exist. Accordingly, two successive days when very light production was scheduled were selected. After each cab in that day's production left the electrocoating tank with a freshly applied wet E coat, the production line was stopped. Each time the line was stopped the cab which had just received its E coat was air dryed with portable hot air blowers to dehydrate the E coat and produce a vehicle body temperature of the order of 110° to 130° F. Thereafter, the Valspar water-base primer surfacer was spray applied to thicknesses which ranged from 0.3 to 0.8 mils with an average of 0.5.

Cross hatch tests of baked wet on wet primer coatings showed no pick-off and excellent adhesion. Similar tests on substrates finish coated with Sherwin Williams two-component urethane top coat applied over both sanded and unsanded cabs with baked wet on wet E and sprayed-on coats produced similar results with no pick-off and excellent adhesion. Rub tests of 100 double rubs over baked wet on wet primer coatings showed no film degradation or softening and no primer on the rub cloths.

Each of the cabs produced in this test was manufactured into an over-the-highway truck. Records were kept by body number to follow each vehicle after it was placed in commercial use. About one year later technical representatives of the vehicle manufacturer and the manufacturers of the primer and finish coatings field inspected vehicles to determine whether the coatings had appropriately withstood the rigors of use. Special attention was paid to those vehicles that had been placed in use in colder parts of Canada where road salt is used of the order of seven months a year. Inspection confirmed that the finish coating had exhibited superior corrosion resistance and withstood even the most aggressive environments.

The present invention has been described with a degree of particularity, but it is the intent that the invention include all modifications from the disclosed preferred process falling within the spirit and scope of the appended claims.

I claim:

1. A process of applying a finish to an electrically conductive vehicle body comprising:

a) passing the body through a water-based electrocoating bath while applying a voltage between the body and the bath to coat the body with constituents of the bath;

b) dehydrating the coat to a state of sufficient dryness to permit spray application of a water-base primer while maintaining the coat cool enough to avoid fusing the coat;

c) spraying a coating of water-base primer over the coat; and d) baking the coat and coating for a time long enough and at a temperature high enough to fuse the coat and coating into a unitary smooth finish.

2. The process of claim 1 wherein primer sprayed on an interior portion of the body is pigmented to a desired finished color.

3. The process of claim 1 wherein the priming step is performed without processing of the coat other than the dehydration step.

4. The process of claim 1 wherein the dehydration step is performed in an oven operated at from 150° F. to 200° F. and the body is maintained in the oven from 20 to 30 minutes.

5. The process of claim 1 wherein the baking step comprises placing the body in an oven for about 30 minutes while maintaining the oven at about 360°-375° F.

6. The process of claim 1, further including the step of light sanding selected portions of the baked coating to remove entrained dirt and thereafter finish coating the body.

7. The process of claim 1 wherein the baking step comprises heating the body to about 310° F. for about 10 minutes or longer.

8. A vehicle made in accordance with the process of claim 1.

9. A vehicle made in accordance with the process of claim 2.

10. A vehicle made in accordance with the process of claim 3.

11. A vehicle made in accordance with the process of claim 4.

12. A vehicle made in accordance with the process of claim 5.

13. A vehicle made in accordance with the process of claim 7.

14. A process of applying finish to a vehicle body of electrically conductive material comprising:

a) passing the body through a water-based electrocoating bath while applying a voltage between the body and the bath to coat the body with constituents of the bath;

b) placing the body in an atmosphere of from 150° F. to 250° F. to dehydrate the coat to a state of sufficient dryness to permit spray application of a water-base primer while maintaining the coat cool enough to avoid prefusing;

c) following the dehydration step and without further processing of the coat, spraying a coating of water-base primer over the coat;

d) baking the coat and coating by heating the body to about 310° F. for about 10 minutes or longer; and e) thereafter light sanding selected portions of the baked coating to remove entrained dirt and thereafter finish coating the body.

15. The process of claim 14 wherein the dehydrating step yields a body temperature of from 115° F. to 125° F.

16. The process of claim 14 wherein the baking step is performed for about 30 minutes with an oven having a temperature of from 360° F. to 375° F.

17. The process of claim 14 wherein the coat is from 0.66 mil to 1.1 mil in thickness and the coating is from 0.3 mil to 0.8 mil in thickness.

18. A vehicle made in accordance with the process of claim 14.

19. A vehicle made in accordance with the process of claim 15.

20. A vehicle made in accordance with the process of claim 16.

21. A vehicle made in accordance with the process of claim 17.

* * * * *